(12) United States Patent
Harris et al.

(10) Patent No.: US 11,718,174 B2
(45) Date of Patent: Aug. 8, 2023

(54) VEHICLE WITH ENGINE POWER LIMITING BASED ON CLUTCH CAPACITY

(71) Applicant: FORD GLOBAL TECHNOLOGIES, LLC, Dearborn, MI (US)

(72) Inventors: Nicholas Harris, West Bloomfield, MI (US); Andrew Monticello, Farmington Hills, MI (US); Kyle Culek, Royal Oak, MI (US); Ashok E. Rodrigues, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/329,415

(22) Filed: May 25, 2021

(65) Prior Publication Data

US 2022/0379722 A1 Dec. 1, 2022

(51) Int. Cl.
*B60K 23/08* (2006.01)
*B60K 17/348* (2006.01)
(Continued)

(52) U.S. Cl.
CPC .............. *B60K 23/08* (2013.01); *B60K 17/02* (2013.01); *B60K 17/348* (2013.01); *F16D 48/06* (2013.01); *F16D 2500/10431* (2013.01); *F16D 2500/30404* (2013.01); *F16D 2500/30406* (2013.01); *F16D 2500/3108* (2013.01)

(58) Field of Classification Search
CPC ...... B60K 23/08; B60K 17/02; B60K 17/348; B60K 17/344–354; F16D 48/06; F16D 2500/10431; F16D 2500/30404; F16D 2500/30406; F16D 2500/3108; F16D 2500/70458; F16H 48/36–2048/368; F16H 48/22; B60W 2510/0241; B60W 2510/025; B60W 2710/0666; B60W 2710/0672
See application file for complete search history.

(56) References Cited

U.S. PATENT DOCUMENTS 4,722,426 A 2/1988 Bellanger
6,834,225 B1 12/2004 Jiang et al.
(Continued)

FOREIGN PATENT DOCUMENTS

EP 3312068 A1 4/2018

*Primary Examiner* — David R Morris
(74) *Attorney, Agent, or Firm* — Vincent Mastrogiacomo; Brooks Kushman P.C.

(57) ABSTRACT

An all-wheel-drive vehicle includes a primary axle operably coupled to an engine and a secondary axle having an input operably coupled to the engine a first halfshaft, a second halfshaft, a first clutch selectively connecting the first halfshaft to the input, and a second clutch selectively connecting the second halfshaft to the input. A transmission has an input coupled to the engine and output coupled to the primary drive axle. A driveshaft couples a power-transfer unit and the input, and a third clutch selectively couples the output to the driveshaft. A controller is programmed to, during a power-limiting routine, command a torque to the engine based on closed-loop feedback control such that the torque decreases when a calculated slip of a selected one of the first and second clutches is greater than a target slip of the selected clutch and increases when the calculated slip is less than the target slip.

7 Claims, 5 Drawing Sheets

(51) Int. Cl.
    *B60K 17/02*     (2006.01)
    *F16D 48/06*     (2006.01)

(56)           References Cited

U.S. PATENT DOCUMENTS

| | | | |
|---|---|---|---|
| 6,943,676 | B2 | 9/2005 | Mack |
| 7,455,619 | B2 * | 11/2008 | Jiang .................... B60W 10/02 |
| | | | 477/904 |
| 8,234,050 | B2 | 7/2012 | Burns et al. |
| 8,246,520 | B2 * | 8/2012 | Ginther ............... B60W 30/186 |
| | | | 477/181 |
| 9,643,614 | B2 | 5/2017 | Masters et al. |
| 10,662,884 | B2 * | 5/2020 | Northrup ........... B60K 23/0808 |
| 2005/0177294 | A1 * | 8/2005 | Jiang .................... F16D 48/066 |
| | | | 701/67 |
| 2007/0265137 | A1 * | 11/2007 | Jiang .................... F16H 61/688 |
| | | | 477/176 |
| 2009/0298648 | A1 * | 12/2009 | Sigmund ................ F16H 48/36 |
| | | | 477/169 |
| 2009/0318265 | A1 * | 12/2009 | Ginther ............... B60W 10/119 |
| | | | 477/181 |
| 2018/0111479 | A1 * | 4/2018 | Grutter ................. B60K 17/35 |
| 2018/0141558 | A1 * | 5/2018 | Grutter ............... B60K 17/344 |
| 2018/0162398 | A1 * | 6/2018 | Grutter ............. B60K 17/3505 |

\* cited by examiner

US 11,718,174 B2

VEHICLE WITH ENGINE POWER LIMITING BASED ON CLUTCH CAPACITY

TECHNICAL FIELD

This disclosure relates to a vehicle having a clutch-based driveline and more specifically to controlling clutch slip using a closed-loop feedback controller to limit engine torque during a power-limiting routine.

BACKGROUND

A motor vehicle includes a powerplant, e.g., an engine, for providing propulsion. Power produced by the engine can be routed to the wheels in a variety of different configurations such as rear-wheel drive, front-wheel drive, four-wheel drive, or all-wheel drive (AWD). Front-wheel drive and rear-wheel drive vehicles include a drive axle that receives powertrain torque and a non-driven axle that is not powered. In contrast, four-wheel-drive and all-wheel-drive are capable of providing power to both axles. These vehicles typically have a power bias resulting in a primary drive axle and a secondary drive axle.

SUMMARY

According to one embodiment, an all-wheel-drive vehicle includes a primary drive axle, a secondary drive axle, and an all-wheel-drive powertrain configured to selectively power the primary and secondary axles. The powertrain includes a powerplant and a clutch that selectively couples the powerplant to the secondary axle. A controller is programmed to, in response to the powertrain being in a power-limiting routine, command a torque to the powerplant based on an error between a target slip of the clutch and a slip of the clutch.

According to another embodiment, an all-wheel-drive vehicle includes an engine, a primary axle operably coupled to the engine, and a secondary axle. The secondary axle includes an input operably coupled to the engine, a first halfshaft, a second halfshaft, a first clutch selectively connecting the first halfshaft to the input, and a second clutch selectively connecting the second halfshaft to the input. A controller is programmed to, during a power-limiting routine, command a torque to the engine based on closed-loop feedback control such that the torque decreases when a calculated slip of a selected one of the first and second clutches is greater than a target slip of the selected clutch and increases when the calculated slip is less than the target slip.

According to yet another embodiment, a vehicle includes an engine, an axle selectively coupled to the engine by one or more clutches, and a controller. The controller is programmed to command a torque to the engine based on closed-loop feedback control such that the torque decreases when a slip of the clutch is greater than a target slip of the clutch and increases when the slip is less than the target slip.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
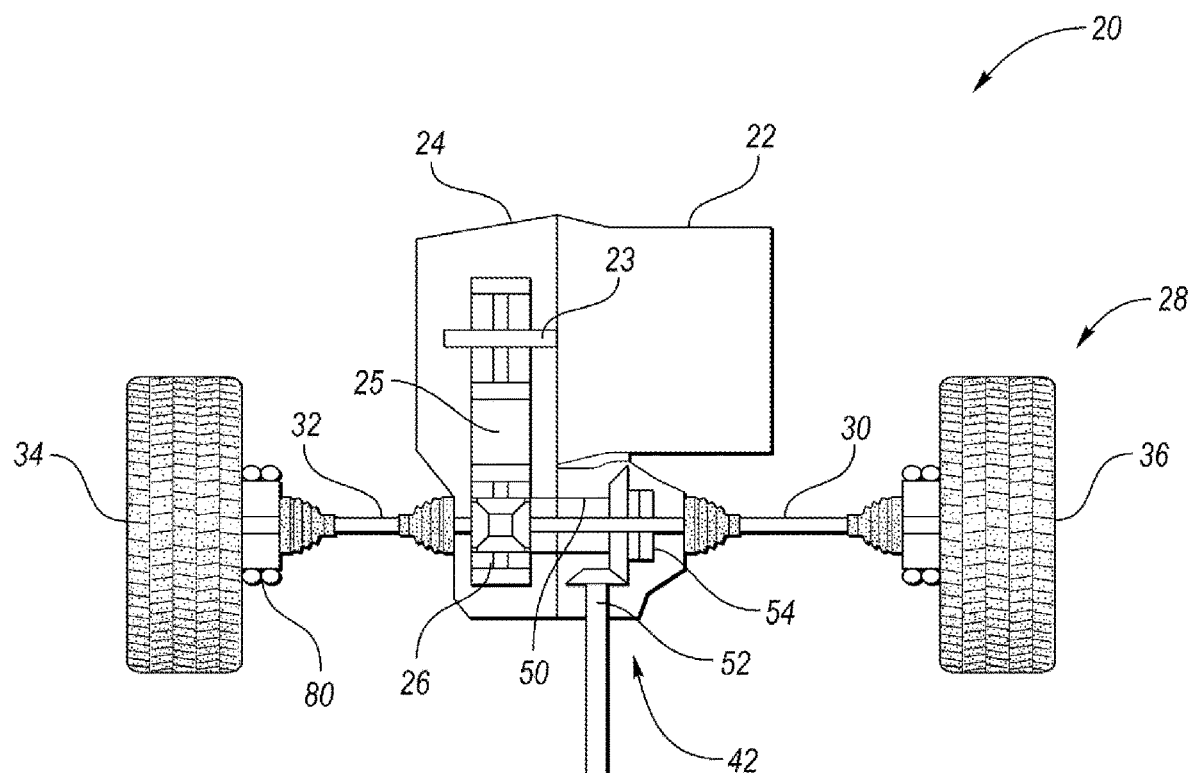
FIG. 1 is a schematic diagram of a vehicle having a rear-drive unit according to one or more embodiments.
Figure 1:
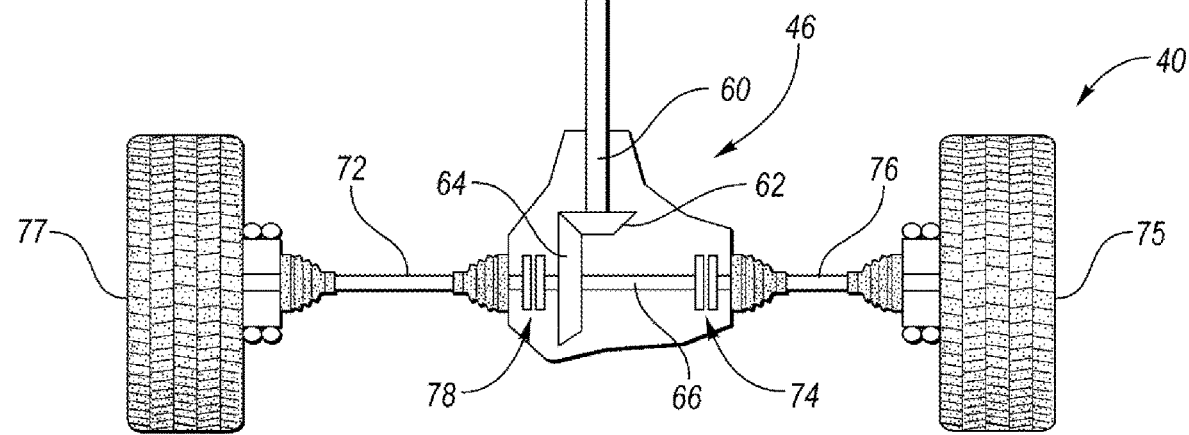

Referring to FIG. 1, an all-wheel-drive vehicle 20 includes a powerplant 22 such as an internal-combustion engine or an electric machine. In the illustrated embodiment, the powerplant 22 is an internal-combustion engine configured to operate on gasoline, diesel, or other fuel. The engine 22 may be mounted transversely in the vehicle 20 (as shown) or longitudinally in other embodiments. A transmission 24 (e.g., a transaxle) includes an input 23, e.g., a shaft, coupled to the engine 22. The transmission 24 may be a multi-speed step-ratio transmission such as an automatic or manual transmission. The transmission 24 includes an output 25, e.g., a gear or chain, coupled to a differential 26 associated with the front axle 28. The differential 26 receives power from the transmission 24 and outputs that power to the halfshafts 30, 32 of the front axle 28. In the illustrated embodiment, the vehicle 20 is biased to front-wheel drive and the front axle 28 is the primary axle. As the primary axle, the engine 22 and the front wheels 34, 36 are drivably connected whenever the transmission 24 is in gear, e.g., DRIVE. Two components are drivably connected if they are connected by a power flow path that constrains their rotational speeds to be directly proportional.

The rear axle 40 is the secondary axle and selectively receives power from the engine 22 as needed or may always receive power. For example, the secondary axle 40 may receive power from the engine 22 when traction of the front wheels 34, 36 is limited, when the engine 22 is producing high power, or other conditions as known in the art. The rear axle 40 is operably coupled to the engine 22 by a power-transfer unit (PTU) 42, a driveshaft 44, and a rear-drive unit (RDU) 46. (The RDU is sometimes referred to as a differential.) The PTU 42 includes an input 50, e.g., a shaft or case, that is fixedly coupled to the differential 26 and an output 52 that is fixedly coupled to the driveshaft 44. A group of rotating elements are fixedly coupled to one another if they are constrained to rotate as a unit in all operating conditions. Rotating elements can be fixedly coupled by spline connections, welding, press fitting, machining from a common solid, damper connections, or other means. Slight variations in rotational displacement between fixedly coupled elements can occur such as displacement due to lash or shaft compliance and damper oscillations.

A clutch 54 selectively couples the input 50 and the output 52. Two rotating elements are selectively coupled when the elements are constrained to rotate together in a first condition and are free to rotate at unrelated speeds in one or more other conditions. When the clutch is engaged, the driveshaft 44 receives power. When the clutch is disengaged, the driveshaft 44 does not receive power. Generally, the clutch 54 is engaged when the vehicle is in an all-wheel-drive mode and is disengaged when the vehicle is in a front-wheel drive mode. Some vehicle may have a rear-wheel-drive mode.

The RDU 46 includes an input 60 fixedly coupled to the driveshaft 44. The input 60 may include a shaft that supports a pinion gear 62. The pinion 62 may mesh with a bevel gear 64. The bevel gear 64 may be fixedly coupled to a shaft or case 66. A pair of clutches 74, 78 selectively couple the bevel gear 64 to the wheels 75, 77 and cooperate to act as a differential allowing speed differences between the wheels 75, 77 when cornering. The clutch 74 is associated with the halfshaft 76 and includes a first side connected to the shaft 66 and a second side connected to the halfshaft 76. The clutch 78 is associated with the halfshaft 72 and includes a first side connected to the shaft 66 and a second side connected to the halfshaft 72. When the clutches 74, 78 are engaged, the halfshafts 72, 76 are coupled to the shaft 66, and when the clutches are disengaged, the halfshafts are decoupled from the driveline. Used herein "engaged" includes both full engagement of the clutch (locked) and partially engagement of the clutch (slipping). Used herein "disengaged" refers to an open clutch in which torque is not transferred across the clutch.

The clutch 78 may be a multi-plate wet clutch that includes a clutch pack. The clutch pack includes a first set of friction plates rotationally fixed to the shaft or case 66 and a second set of friction disks rotationally fixed to the halfshaft 72. An actuator of the clutch 78 is configured to compress the plates and disks together to create clutch capacity, i.e., torque transfer through the clutch. The actuator may be an electronic actuator, such as an electric motor, that is configured to compress the clutch pack to engage the clutch. In one or more example embodiments, an electric motor drives a ball-ramp mechanism that increases and decreases the force applied to the clutch pack to control clutch capacity. Of course, other types of mechanisms may be used in other embodiments. The clutch 74 is similarly structured.

In the vehicle 20, torque to the rear wheels is controlled by adjusting the capacity of the clutches 74, 78. When the clutches 74, 78 are disengaged, power cannot flow from the input 60 to the wheels 77, 75 of the rear axle 40; thus, the vehicle is in front-wheel drive. When the clutches 74, 78 are engaged, power flows to the rear axle and to propel the vehicle using both the front axle 28 and the rear axle 40, i.e., all-wheel drive. The clutch 78 may be designed to slip throughout all-wheel drive operation to modulate the torque split between the front and rear axles based on sensed conditions. The clutches may also be controlled to provide torque vectoring.

The vehicle 20 may include wheel sensors 80, such as individual wheel sensors 80 located at each wheel. The wheel sensors 80 are configured to output a signal indicative of an angular velocity of their associated wheel. The wheel sensors 80 are in electric communication with a controller 82. The controller 82 is configured to receive the signals from the wheel sensors 80 and determine a speed for each of the wheels. Using the wheel speeds, the controller can determine the relative speeds between each of the wheels, between each of the axles, between wheels of a same axle, and the like to determine traction conditions, slips of the clutches 74, 78, and other conditions that are used to control the all-wheel-drive system and other systems of the vehicle. For example, the controller 82 may be programmed to determine the average wheel speed for the front axle based on the speed sensors 80 associated with the front wheels 34, 36, and to determine the average wheel speed for the rear axle 40 based on the speed sensors 80 of the rear wheel 77, 75. The controller 82 may be further programmed to compare the average wheel speeds of the front and rear axles 28 and 40 to determine the relative wheel slip between these axles and the slips of the clutches.

The controller 82, such as a powertrain control unit (PCU), an engine control module (ECM), and an all-wheel drive controller, while illustrated as one controller may be part of a larger control system and may be controlled by various other controllers throughout the vehicle 20, such as a vehicle system controller (VSC). It should therefore be understood that the controller 82 and one or more other controllers can collectively be referred to as a "controller" that controls various actuators in response to signals from various sensors to control functions such as starting/stopping of the engine, scheduling transmission shifts, operating the clutches of the all-wheel drive-system etc. Controller 82 may include a one or more microprocessors or central processing units (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 82 may communicate signals to and/or from the engine 22, the transmission 24, the PTU 42, the RDU 46, the wheel sensors 80, and others. Although not explicitly illustrated, those of ordinary skill in the art will recognize various functions or components that may be controlled by controller 82 within each of the subsystems identified above. Representative examples of parameters, systems, and/or components that may be directly or indirectly actuated using control logic executed by the controller.

Control logic or functions performed by controller 82 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 82. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller is configured to determine a driver-demanded wheel torque based on an accelerator-pedal position. The controller may command this torque, or a torque derived therefrom, to the powerplant, e.g., the engine 22. The controller may estimate the torque produced by the powerplant. For internal-combustion engines, the controller may determine the torque produced based on the amount of air and fuel entering the engine and other factors. The powertrain torque estimate at the wheels may be calculated by measuring the air and fuel being consumed by the engine and accounting for losses from friction, accessories, gearing, fluid pumping, and other ancillary power consumers to determine the net torque available at the wheels.

The controller 82 is also configured to estimate the slips of the clutches 74, 78. For example, the controller may determine the slips based on speed differences between the front wheels and the rear wheels. The controller 82 may calculate a speed of the driveshaft 44 based on an average speed of the front wheels. This provides the input speed to the RDU 46. This input speed can then be individually compared to the wheels 75, 77 to determine a speed difference therebetween. Those speed differences are the slips of the clutches 74, 78. The slips may be expressed as an angular velocity, e.g., RPM, or as a linear velocity, e.g., miles per hour.

The controller 82 is also configured to estimate the clutch capacity of the one or more clutches associated with the all-wheel-drive system. For example, the controller may determine the clutch capacity based on the amount of pressure applied by the clutch actuator. Rather than directly measuring the pressure, the controller may determine the pressure applied based on the position of the clutch actuator or the electric current being drawn by the actuator, for example. The controller may include one or more lookup tables that correlate actuator position or current to clutch torque capacity or pressure. In one example embodiment, the lookup table outputs a clutch capacity based on the actuator position, the clutch slip, and the clutch temperature. Of course, other factors may be considered based on the specific design of the clutch and actuator.

The controller 82 is further configured to determine temperatures of the clutches based on an oil temperature of the RDU, clutch slip, and clutch torque capacity. One or more lookup tables may be used to determine this. The controller may also determine a clutch power, which may be the power produced from the slipping clutch, i.e., the power wasted to clutch slip. The controller may determine the power resulting from the clutch slip by using the clutch's torque and relative angular velocity between components, e.g., between clutch plates. Alternatively, the clutch power may be the power going through the clutch. Power going through the clutch may be calculated by multiplying clutch torque and rotational speed. This can be converted into Watts of power. The controller may further determine an estimated wheel torque. The estimated wheel torque is a summation of the torques at the driven wheels. The wheel torque is based on powerplant torque, gearing, driveline losses, clutch slip, and wheel slip.

Figure 2:
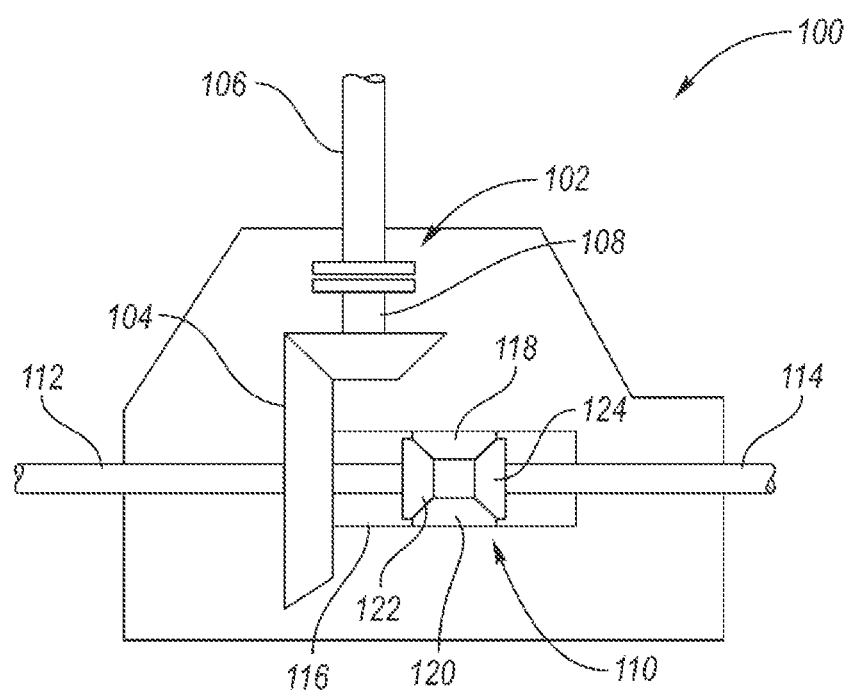
FIG. 2 is a schematic diagram of a rear-drive unit according to one or more alternative embodiments.

FIG. 2 illustrates a drive unit 100 according to an alternative embodiment. The drive unit 100 may be associated with the secondary axle such as the rear axle in the architecture of FIG. 1 or the front axle in an alternative embodiment. The drive unit 100 may also be referred to as a differential. The drive unit 100 includes a single clutch 102 that is upstream of the bevel gear 104. For example, the clutch 102 may have a first side connected to the input shaft 106 (which is coupled to the driveshaft) and a second side connected to a pinion shaft 108. A differential mechanism 110 distributes torque between the left and right halfshafts 112, 114. The differential mechanism 110 may be an open differential or limited-slip differential as known in the art. The differential mechanism 110 may include a carrier 116 that supports the bevel gear 104, a pair of spider gears 118, 120, and a pair of side gears 122, 124. The side gears may be fixedly coupled to the halfshafts. In an alternative embodiment the drive unit 100 may be modified by moving the clutch to a side-mounted position. Here, the pinion is fixedly coupled to the driveshaft and the clutch selectively the half shafts to power.

Clutches have a maximum torque capacity rating that is based on the design of the clutch. For example, a clutch may be designed to transmit 400 Newton-meters (Nm) of torque across the clutch. If the torque applied to the input side of the clutch exceeds 400 Nm, the clutch is unable to transmit more than the maximum torque capacity to the output side of the clutch. The excess torque results in slip and becomes wasted heat energy. In some vehicles, the clutches may be sized such that the engine is incapable of producing torque in excesses of the maximum torque capacity. This, however, results in a clutch that is oversized for most operating conditions. Vehicle costs may be reduced by sizing the clutch more appropriately with the predominant use cases. Here, the clutch may be undersized in extreme scenarios resulting in clutch slip.

Referring back to the example of FIG. 1, the powertrain torque may exceed the maximum torque capacity of the clutches 74, 78 in some situations. For example, when 90 percent of the maximum powerplant torque is sent to the rear wheels (such as when the front wheels have very low traction and the driver-demanded torque is high) the clutch may receive torque in excess of the maximum torque capacity resulting in excessive clutch slip. The RDU 46 is designed for a certain amount of clutch slip, but excessive clutch slip can cause premature wear.

As will be explain below, a control strategy and method may be implemented to prevent excessive clutch slip. The controller may monitor parameters associated with the powertrain and activate a power-limiting mode when the parameters indicate that excessive clutch slip is sensed or is eminent. During the power-limiting mode, the torque commanded to the powerplant is limited to a torque estimated to reduce the clutch slip to a nonzero slip target. This torque may be referred to as the upper torque limit. When in the power-limiting mode, the driver-demanded powerplant torque is clipped to the upper torque limit to control clutch slip. The nonzero slip target may be dynamic and adjusted each loop of the controls and not just when triggered. For example, the target may become smaller as clutch temperature increases, even while triggered.

Figure 3:
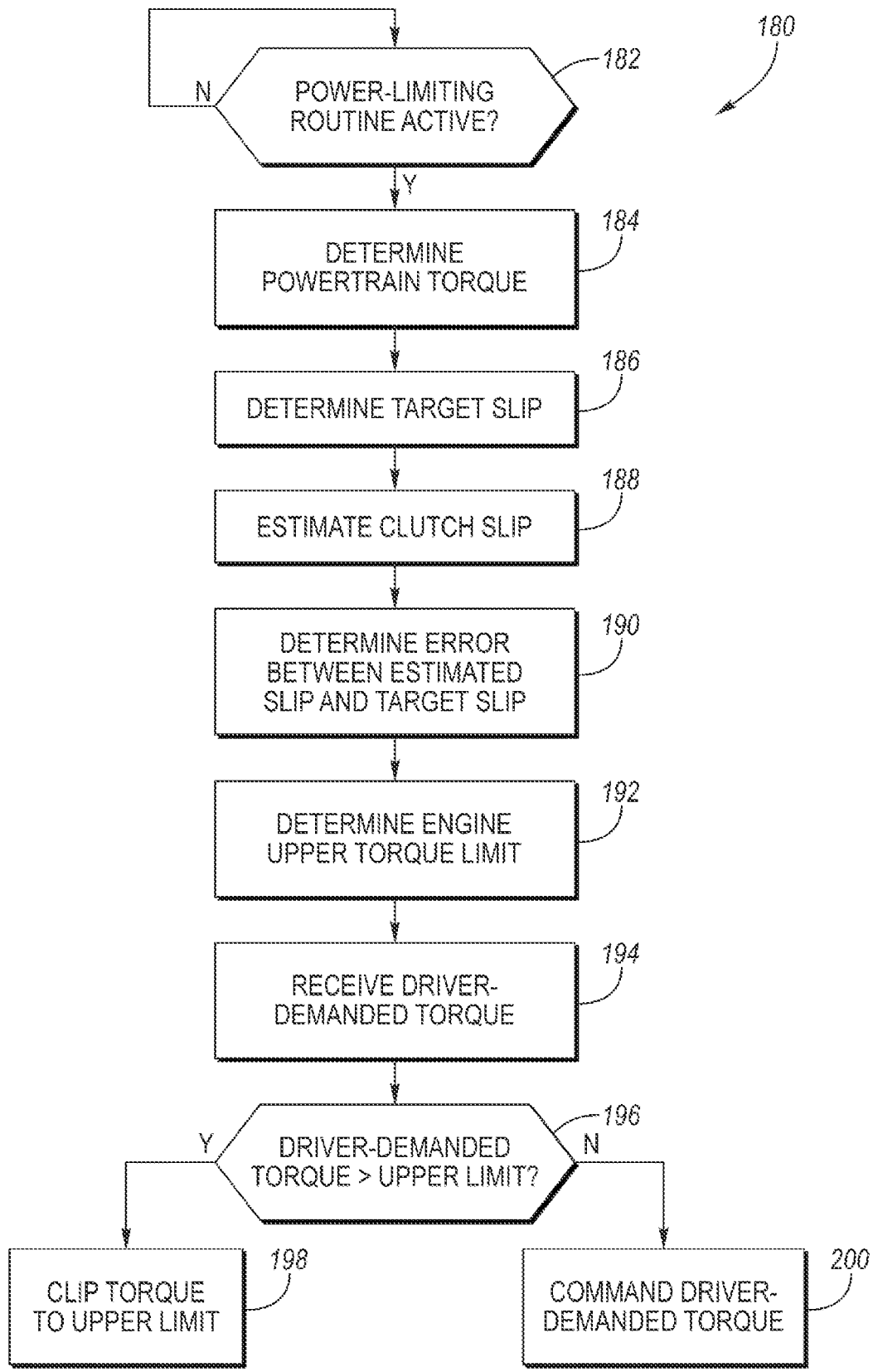
FIG. 3 is a flow chart of an algorithm for operating a vehicle during a power-limiting routine.
Figure 4:
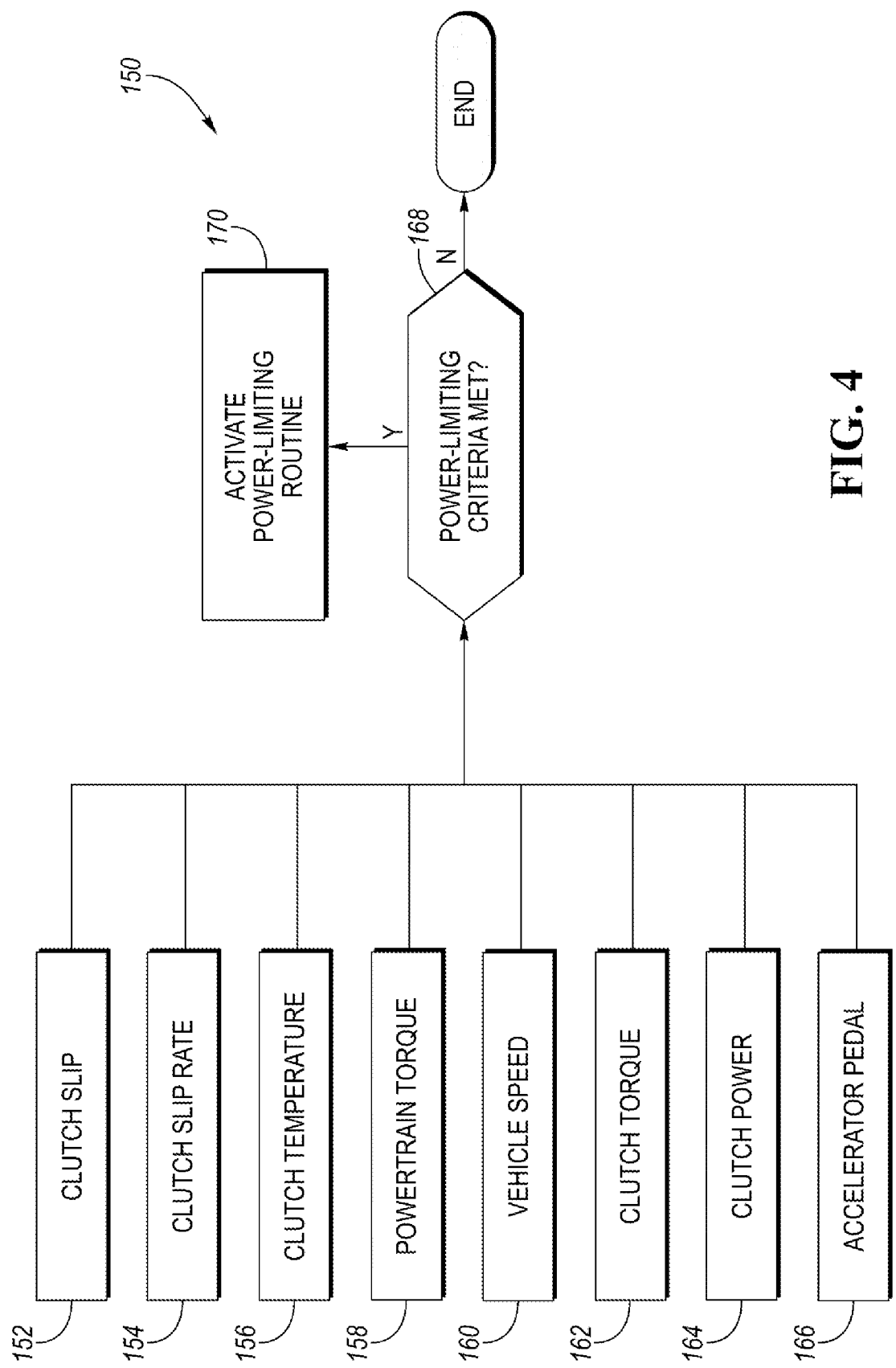
FIG. 4 is a control diagram of a control system for determining if entry criteria for the power-limiting mode are met.

FIG. 3 illustrates an example control diagram 180 for operating the vehicle in a power-limiting routine. At operation 182, the controller determines if the power-limiting routine is active. FIG. 4 shows controls for activating the power-limiting routine. The controller may consider several criteria including clutch slip 152, clutch slip rate 154, clutch temperature 156, powertrain torque 158, vehicle speed 160, clutch torque 162, clutch power 164, and accelerator pedal position 166. These criteria may be data that is measured, calculated, inferred, or estimated through sensors, modeling, testing, or the like. The data is fed into a decision box 168 that includes one or more algorithms for determining whether or not the data indicates that the power-limiting routine is desired. The decision box may include a matrix of different combinations of the criteria, that once satisfied, trigger the power-limiting routine. For example, if the clutch slip 152 exceeds a threshold, and the clutch temperature 156 exceeds a threshold, and the powertrain torque 158 exceeds a threshold, then the criteria is satisfied and the controller activates the power-limiting routine at operation 170. This, of course, is just one example and many different combinations of the criterion may result in activation of the power-limiting routine depending upon the particular design of the clutch.

At operation 184, the controller either determines the powertrain torque or receives the powertrain torque from another module. The powertrain torque may be expressed at the engine crankshaft, at the transmission output shaft, or at the wheels. The controller may convert the powertrain torque from one domain to the other by modifying the engine torque by the gear ratio and losses as is known in the art.

At operation 186, the controller determines a target slip for the closed-loop feedback controls. The slip target may be based on a drive mode of the vehicle, clutch temperature, vehicle speed, traction control status, pedal position, the powertrain torque, and other vehicle characteristics. The drive mode may be touring, normal, sport, wet, track, snow/ice, sand, rock, or the like. The controller may include one or more lookup tables that determine a target slip based on these and/or other factors. At operation 188, the controller calculates an estimated slip of the clutch or clutches as described above. At operation 190, the controller determines an error between the estimated slip and the target slip.

Figure 5:
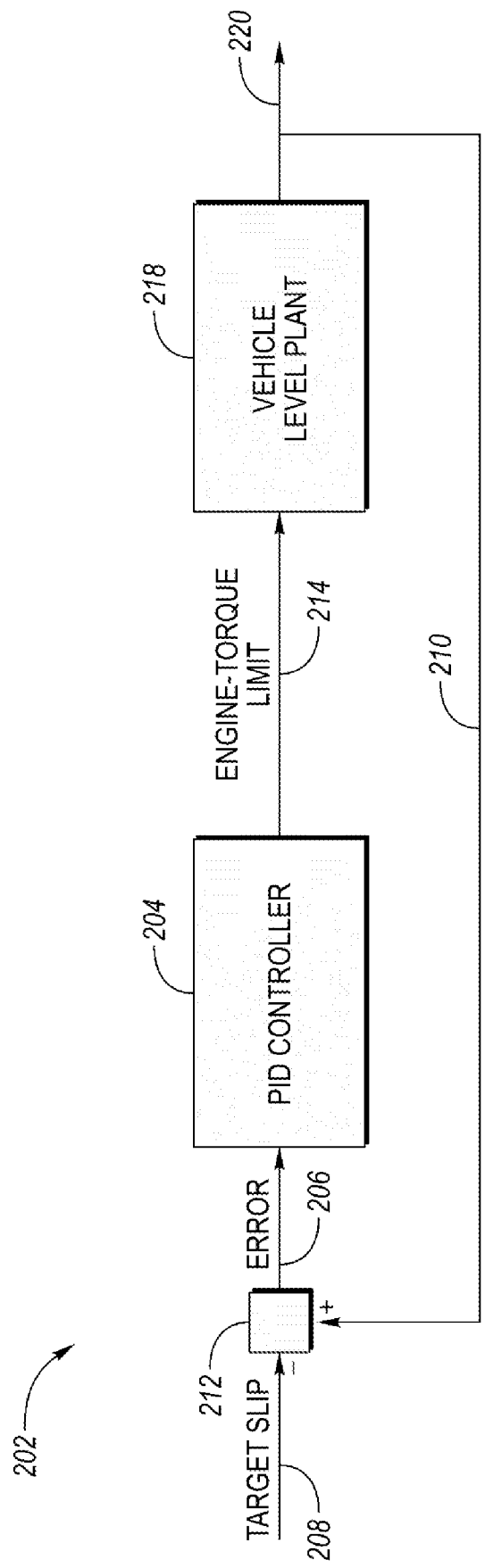
FIG. 5 is a control diagram of a closed-loop feedback controller that controls a powerplant-torque limit based on an error between estimated and target clutch slip.

The target slip, estimated slip, and error are used to determine the torque limit and commanded powerplant torque using a closed-loop feedback controller such a proportional-integral-derivative (PID) controller. In other embodiment, feedback controller may be a P or PI controller. FIG. 5 illustrates a control diagram 202 of the closed-loop controls. The control diagram 202 includes a PID controller 204 that receives the error 206 between the target slip 208 and the estimated, calculated, or measured slip 210 as determined by summation block 212. The error 206 includes both a magnitude and a sign, which are both used to determine the powerplant-torque limit. The sign is used to determine whether or not to increase or decrease the powerplant-torque limit. For example, if the target slip exceeds the estimated slip, then the powerplant-torque limit may be increased, and if the estimated slip exceeds the target slip, and the engine-torque limit may be decreased. The PID controller 204 receives the error and calculates a proportional component torque, an integral component torque, and a differential component torque, which are summed to determine the powerplant-torque limit 214 at operation 192, which is an engine-torque limit in the illustrated embodiments.

The vehicle-level plant 218 receives the powerplant-torque limit 214, among other things, and outputs a final torque request 220 for the powerplant and the estimated clutch slip 210. The final torque request 220 is based on the torque limit 214 and the driver-demanded torque. The torque request 220 may be expressed at several different domains depending on the embodiment. For example, the torque request may be at the powerplant (e.g., engine), at the transmission output shaft, or at the wheels.

At operation 194, the controller receives the driver-demanded torque. The driver-demanded torque may be in the wheel domain. At operation 196, the driver-demanded torque is compared to the powerplant upper torque limit. In order to compare, these torques must be in the same domain. The controller is programmed to convert the torques to the various domains as discussed above. In one or more embodiments, the torques of operation 196 are in the engine domain. If the driver-demanded torque is greater than the upper engine-torque limit, control passes to operation 198, and the controller clips the engine torque command to the upper limit and the upper torque limit is commanded to the engine. The engine controller is configured to receive the torque request and produce that torque by adjusting throttle position, timing, fuel ratio, spark, and the like. If the driver-demanded torque is less than the upper limit, control passes operation 200 and the controller commands the driver-demanded torque to the engine similar to normal operation of the vehicle. At operation 200, the controller may compare current conditions to exit conditions and exit these controls if the exit conditions are met.

The above-described controls enable robust operation of an all-wheel-drive system, limited-slip differential, or the like having reduced cost components, such as clutch(es), that more closely match predominant use cases. The controls provide ware resistance and prolonged the life of the driveline system for even the most extreme use cases. In one or more alternative embodiments, a clutch of an electric limited-slip differential may be controlled as discussed above.

If one or more components are to be monitored for protection, e.g., twin-clutch RDUs, arbitration logic can be used. The logic may consider a variety of inputs to determine optimal control of the overall system. For example, the controller may target (select) the clutch with the largest amount of relative slip. Alternatively, the controller may target the clutch with the largest power resulting from the clutch slip. Other inputs such as wheel speed, steering wheel position, or lateral acceleration could also be used, or a combination of inputs can be used to protect for a variety of scenarios. In some embodiments, the controls may use both power from slip (slip times torque) and the total amount of slip and also dead bands to minimizes excessive switching of which clutch to target.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An all-wheel-drive vehicle comprising:
   an engine;
   a primary axle operably coupled to the engine;
   a secondary axle including an input operably coupled to the engine, a first halfshaft, a second halfshaft, a first clutch selectively connecting the first halfshaft to the input, and a second clutch selectively connecting the second halfshaft to the input; and
   a transmission having an input coupled to the engine and output coupled to the primary drive axle;
   a power-transfer unit coupled to the transmission and including a third clutch; and
   a driveshaft coupling the power-transfer unit and the input, wherein the third clutch selectively couples the output to the driveshaft;
   a controller programmed to, during a power-limiting routine, command a torque to the engine based on closed-loop feedback control such that the torque decreases when a calculated slip of a selected one of the first and second clutches is greater than a target slip of the selected clutch and increases when the calculated slip is less than the target slip.

2. The all-wheel-drive vehicle of claim 1, wherein the target slip is greater than zero.

3. The all-wheel-drive vehicle of claim 1, wherein the target slip is based on vehicle speed and a temperature of the clutch.

4. The all-wheel-drive vehicle of claim 1, wherein the controller is further programmed to initiate the power-limiting routine responsive to the calculated slip, a temperature of the clutch, and a power of the selected clutch satisfying initiation criterion.

5. The all-wheel-drive vehicle of claim 1, wherein the target slip is based on a drive mode of the vehicle.

6. The all-wheel-drive vehicle of 1, wherein the torque commanded to the engine is based on a summation of a proportional component torque, an integral component torque, and a differential component torque.

7. The all-wheel-drive vehicle of claim 6, wherein the controller is further programmed to increase the torque commanded to the engine when the summation is less than a lower limit such that the torque commanded to the engine is greater than or equal to the lower limit.

\* \* \* \* \*